United States Patent [19]

Zehnpfennig

[11] 3,711,188
[45] Jan. 16, 1973

[54] COMPACT OPTICAL DISPLAY SYSTEM

[75] Inventor: Theodore F. Zehnpfennig, Wayland, Mass. 01778

[73] Assignee: Visidyne Inc. Woburn, Mass.

[22] Filed: June 10, 1970

[21] Appl. No.: 45,112

[52] U.S. Cl. .................350/291, 350/299, 352/61, 350/211
[51] Int. Cl. ..............................................G02b 5/08
[58] Field of Search......350/106, 211, 144, 288–299, 350/301, 302; 352/61; 40/130 B, 219

[56] References Cited

UNITED STATES PATENTS 2,726,573   12/1955   Maloff ................................... 350/211
2,303,113   11/1942   Eckel .................................... 350/106

FOREIGN PATENTS OR APPLICATIONS 898,007   6/1962   Great Britain ....................... 350/291
400,182   7/1909   France ................................ 350/144

*Primary Examiner*—David Schonberg
*Assistant Examiner*—Michael J. Tokar
*Attorney*—Iandiorio & Grodberg, Joseph S. Iandiorio and Lester S. Grodberg

[57]   ABSTRACT

A display device is disclosed including first reflection means, second partially reflecting reflection means disposed at a first angle to the first reflection means and means for directing radiation from an item to be displayed to one of the reflection means at a second angle to produce multiple reflection of the radiation between the first and second reflection means and transmission through the second reflection means to provide a display of the item.

11 Claims, 8 Drawing Figures

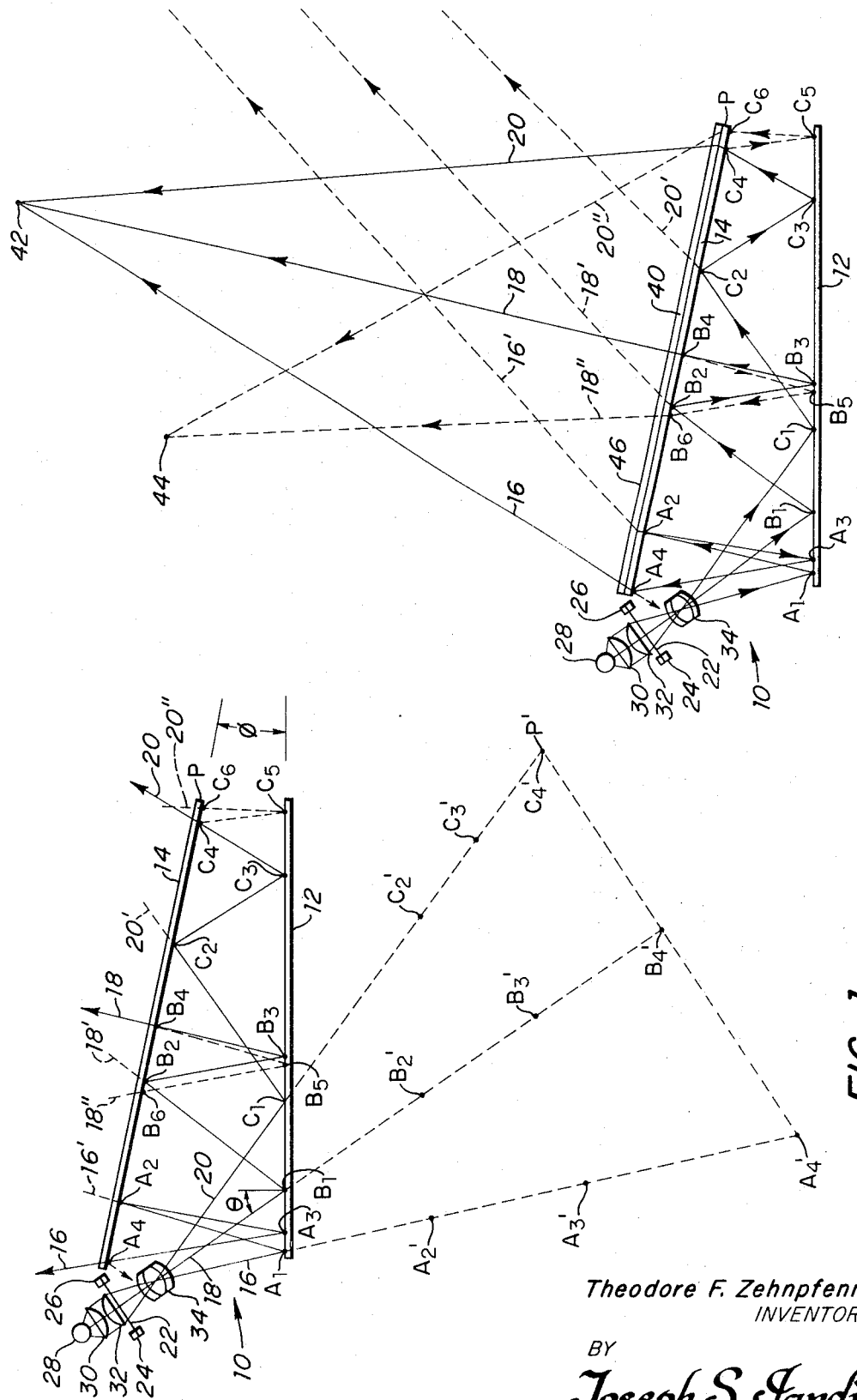

Theodore F. Zehnpfennig
INVENTOR.

BY
Joseph S. Iandiorio
ATTORNEY.

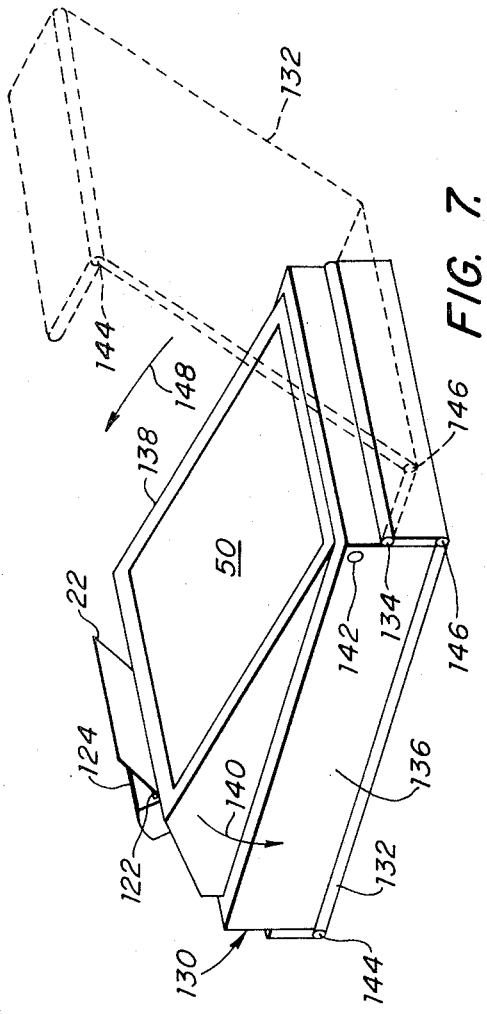
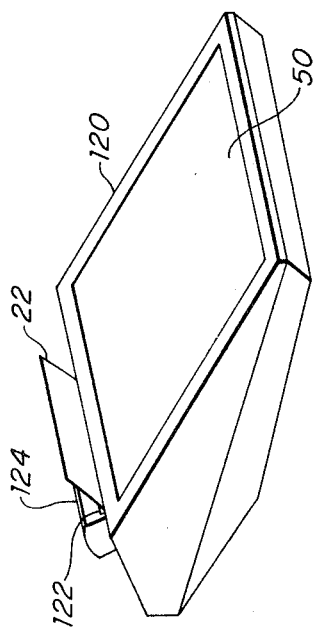

COMPACT OPTICAL DISPLAY SYSTEM

FIELD OF INVENTION

This invention relates to a compact optical display system having a highly folded optical system, and more particularly to such a system using two reflective elements to produce multiple reflections for folding the optical path.

BACKGROUND OF INVENTION

Conventional display devices such as optical projectors and viewers are generally large, heavy and quite expensive. Attempts to reduce their size using a plurality of mirrors to fold the optical path increases their weight substantially because of the additional mirrors and increases alignment problems between mirrors. A more powerful light source may be required to provide sufficient light when a wide angle diffusion screen is used to provide a wide viewing range for the user or users.

These display devices, especially those used to magnify microfilm transparencies to provide a display of suitable size such as the size of a page of a book or an 8½ × 11 inch area with sufficient brightness, are not truly portable. They are better described as table top models. They do not approach in weight and size the traditional portable reading device, a book, nor do they approach a book in the sense of the privacy that a reader has in his ability to read a page while restricting at least to some extent the ability of others to also read the page.

SUMMARY OF INVENTION

It is therefore an object of this invention to provide a compact display device using a highly folded optical system capable of producing a highly magnified and bright image of an item.

It is a further object of this invention to provide a display device capable of operating with an illumination source which may be powered by small, lightweight batteries.

It is a further object of this invention to provide such a display device which makes optimum use of image light emerging from the highly folded optical system and provides a restricted viewing area from which the display may be observed.

It is a further object of this invention to provide such a display device which is wholly portable, may be battery operated and is approximately the size and weight of a book.

It is a further object of this invention to provide such a display device which is capable of providing more than one display for stereoscopic presentation of two similar items to one viewer or simultaneous presentation of two or more items viewable by one or more observers at different vantage points proximate the device.

It is a further object of this invention to provide a small angle diffuser with minimum spurious diffusion adaptable for use with the display device of this invention.

This invention features a display device including first reflection means and second partially reflecting reflection means disposed at a first angle to the first reflection means and means for directing radiation from an item to be displayed to one of the reflection means at a second angle to produce multiple reflections of the radiation between the first and second reflection means and transmission through the second reflection means to provide a display of an item.

In preferred embodiments means for focusing the radiation emerging from the second reflection means are provided and diffusion means are provided to broaden that focus to permit an observer some latitude in positioning his eyes for viewing the display.

DISCLOSURE OF PREFERRED EMBODIMENT

Other objects, features and advantages will occur from the following description of a preferred embodiment and the accompanying drawings, in which:

FIG. 1 is a schematic diagram showing a highly folded optical system according to this invention and showing a ray pattern produced from radiation directed to it.

FIG. 2 is a schematic diagram similar to FIG. 1 with a means for focusing radiation emerging from the folded optical system.

FIG. 6 is an axonometric view of a display unit including the device of this invention.

FIG. 7 is a collapsible display unit including the device of this invention.

FIG. 8 is a sectional, elevational view of the unit of FIG. 7.

Figure 3:
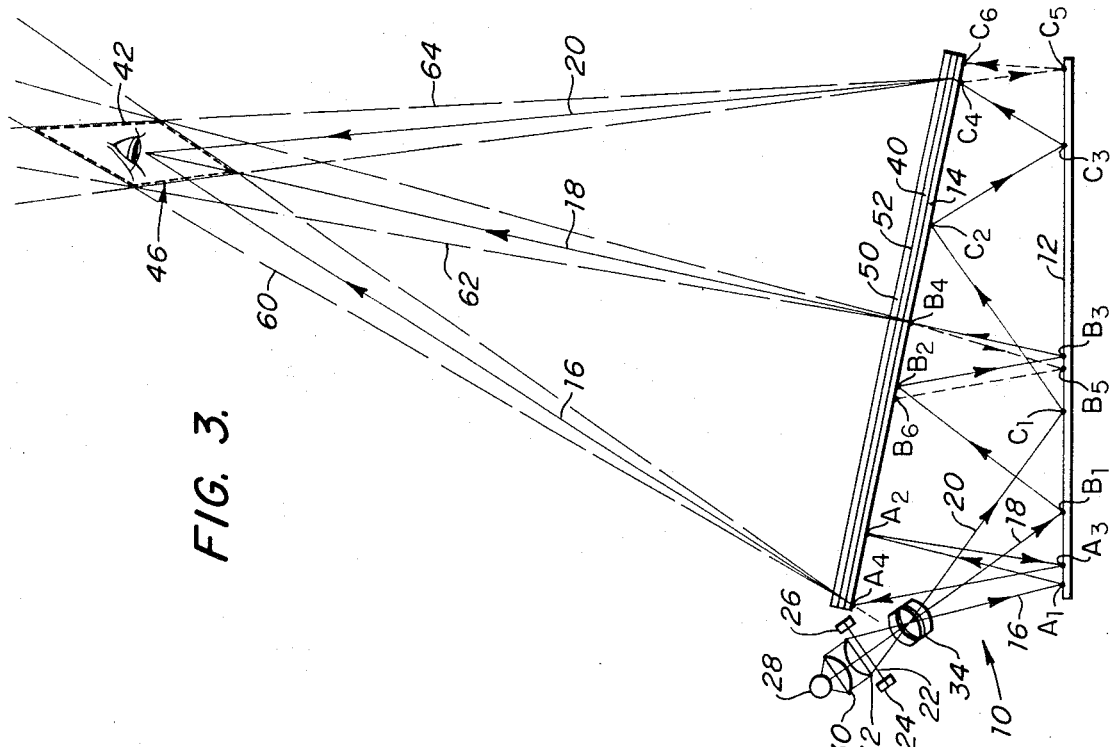
FIG. 3 is a schematic diagram similar to FIGS. 1 and 2 with a means for diffusing the radiation from the means for focusing to broaden the focus area.

There is shown in FIG. 1 a highly folded optical system 10 according to this invention including a highly reflective means, mirror 12 and a partially reflective means 14 disposed at an angle $\phi$ to mirror 12. Radiation rays 16, 18, 20, from an item to be displayed, microfilm 22, positioned by guides 24, 26, and illuminated by light source 28 through lenses 30, 32, is directed at an angle to one of mirrors 12, 14, preferably at angle $\theta$ to mirror 12 as shown, by compound projection lens 34. A virtual image is formed at plane P', while the real image occurs at plane P at mirror 14 magnified by a predetermined power. Mirrors 12, 14 are spaced apart a predetermined distance at an angle $\phi$ relative to angle $\theta$ such that after a predetermined number of reflections the plane P is effectively at mirror 14. The relationship between $\phi$ and $\theta$ may be expressed as: $\theta = n\phi$ where n is the number of reflections a ray undergoes before leaving system 10. In FIG. 1, $n$ is 3. Ray 16 reflects at $A_1$ and at $A_2$ and $A_3$, corresponding to points $A'_2$, $A'_3$ to reach $A_4$ at plane P, corresponding to $A'_4$ at P'. Similarly, ray 18 reflects at $B_1$ and at $B_2$ and $B_3$, corresponding to points $B'_2$, $B'_3$, to reach $B_4$ at plane P, corresponding to $B'_4$ at P', and ray 20 reflects at $C_1$ and at $C_2$ and $C_3$, corresponding to points $C'_2$ and $C'_3$, to reach $C_4$ at plane P, corresponding to $C'_4$ at P'.

An image of microfilm 22 is thereby formed at plane P at mirror 14 by rays 16, 18, 20 escaping mirror at $A_4$, $B_4$, $C_4$. Other spurious images are also formed by those rays escaping through mirror 14 at lower numbered reflections i.e., rays 16', 18', 20' at points $A_2$, $B_2$, $C_2$ and higher numbered reflections i.e., rays 18'', 20'' at points $B_6$, $C_6$ but these are not formed at plane P.

Although plane P has been shown coincident with the underside of mirror 14 this is not a limitation: plane P may be before, at, in or after mirror 14.

The number of reflections is not limited to 3; in the arrangement of FIG. 1 where the radiation is directed first to fully reflecting mirror 12 the image at P' may be made to coincide with plane P at mirror 14 after 3, 5, 7 or any other odd number of reflections. Generally, if the image is directed first to the partially reflecting mirror 14 there will be an even number of reflections before the display reaches plane P, if the image is first directed to mirror 12 there will be an odd number of reflections.

The display provided in this manner at mirror 14 is not visible in its entirety from any one viewing position, rather the observer must move his eyes from spot to spot about mirror 14 to view the display a portion at a time.

The size of the spot visible at any one viewing position may be increased by using a diffuser element which may be placed at or after the partially reflecting mirror 12. In preferred embodiments a lens or other focusing means such as a Fresnel lens 40 may be provided at mirror 14, FIG. 2, to produce a focus at 42 of the rays 16, 18, 20 escaping mirror 14 at $A_4$, $B_4$, $C_4$ after three reflections so that an image of the microfilm 22 may be seen in its entirety by an observer at 42. Other images are formed by Fresnel lens 40, for example rays 16', 18', 20' are focused at some distant point off the drawing in FIG. 2, and rays 18'' and 20'' are focused at point 44. These secondary images will not be seen by the observer whose eye is at primary focus 42. Other types of lenses may be used instead of Fresnel lens but the Fresnel lens is preferred for its low weight and small thickness.

The sharp focus at 42 produces a bright image making efficient use of the light available from mirror 14 as compared to systems which use only a diffusing screen. This sharp focus also requires that one who would observe the display precisely position his eye at focus 42. If this requirement for precise positioning is not desirable or tolerable, the focus may be slightly broadened by using a small angle diffuser which may be implemented by a surface 46 which may be prepared in a random or a patterned manner on the inner or outer face of lens 40, FIG. 2. Alternatively, a separate small angle diffuser 50, FIG. 3, may be used on the outside face 52 of lens 40. Diffuser 50 produces a cone of light 60, 62, 64 about each ray 16, 18, 20, respectively, that produces a broadening of focal point 42 resulting in a focal area 46 throughout which an observer may view the entire display. The diffuser is not restricted to a location at or after the lens 40. A diffuser may be placed anywhere in the system proximate to the plane P following the final reflection either before or after the lens 40.

Figure 4:
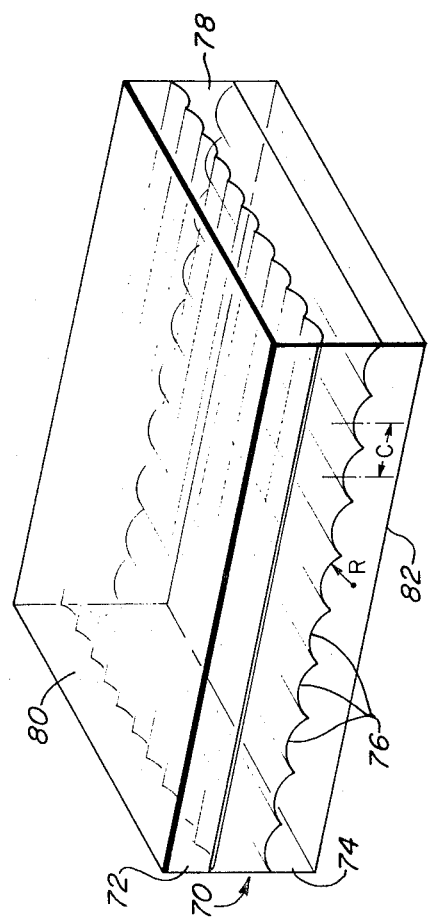
FIG. 4 is a diagram of a small angle diffuser according to this invention.

Preferably, diffuser 50 is one which provides a small angle of diffusion in order that the primary image at area 46 does not become confused with other images. One such diffuser 70, FIG. 4, includes two layers 72, 74 of cellulose acetate butyrate each approximately 0.01 inches thick and having a plurality of cylindrical elements 76 having a radius of curvature R of approximately 0.00437 inch and center spacing C of approximately 0.007 inch. Layers 72, 74 are laminated with their cylindrical elements transverse to each other and with an intermediate layer 78 of silicone rubber approximately 0.005 inch thick. Layers 72, 74 have an index of refraction of 1.49 and intermediate layer 78 has an index of refraction of 1.43. Diffuser 70 provides a diffusion angle of approximately 5°. This diffusion angle may be increased to 15° by making layers 72, 74 of polystyrene having an index of refraction of 1.59. A diffuser may also be made by fixing the flat top surface 80 of layer 72 to the flat under surface 82 of layer 74 and eliminating intermediate layer 78, or a single layer may be constructed with a set of the cylindrical elements on each of its surfaces. Other diffusion members such as an array of tiny spherical lenses may be used but they may be less effective because they generally contain roughened areas between each little lens element which areas may cause wide diffusion of the image light.

Figure 5:
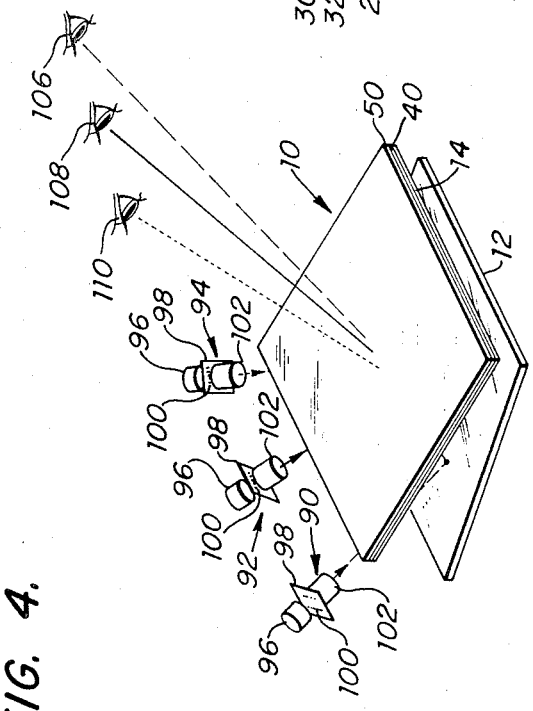
FIG. 5 is an axonometric diagram of a display device according to this invention with plurality of means for directing radiation from an item to be displayed to the folded optical system.

The display device and folded optical system 10 of this invention are not limited to a single display projection. A plurality of means for directing light from an item to be displayed, projection system 90, 92, 94, FIG. 5, each containing a light source 96, support 98 for an item 100 to be displayed and projection lens 102, may be used simultaneously to create three separate images formed at 106, 108, 110 which may be viewed by one or more observers. Stereoscopic viewing can be provided by providing each of two such projection systems 90, 94 with similar items which results in images at areas 106, 110 respectively, viewable by two eyes of an observer. Binocular viewing may be provided by using a beam splitter with a single projection system such as 92 to produce two images from a single item which will be focused at two adjacent areas, for example at 106 and 110, so that an observer can view the display with both eyes just as he would have done at a broadened focus 46, in FIG. 3, but without the use of a diffuser.

The item to be displayed is not limited to microfilm but may be microfiche, microform, images or video tubes, cathode ray tubes, transparencies, or any other items desired to be displayed.

The entire display device may be contained in a unit including a housing 120, FIG. 6, approximately 3 inches high, 10 inches long, and 7 inches wide, having a display area 6 by 8 inches at diffuser 50. The item 22 to be displayed is placed in a slot 122 at the back of the housing 120 in the compartment 124 containing the light source and projection lenses, in FIG. 5 and FIG. 6, discussed supra, like parts from previous drawings have been given like reference numbers.

Another unit including a collapsible housing 130, FIG. 7 having a cover 132 connected to housing 130 at hinge 134, may also be used to contain the display device of this invention. Housing 130 includes an outer member 136 and an inner member 138 which is collapsible into member 136 as shown by arrow 140. Inner member 138 is pivoted to outer member 136 at pivot 142 and also contains a display area at diffuser 50 and a slot 122 in compartment 124 for viewing an item 22 to be displayed. Cover 132 is hinged at 144, 146 so that it can wrap around the base of outer member 136 when the unit is in use and be swung around arrow 148, as shown in phantom to cover the top of member 136 when member 138 is collapsed into it.

Member 138 may be biased to pop-up partially out of member 136 to the position shown in FIG. 7, by a spring 150, FIG. 8, attached to the base 152 of member 136 and base 154 of member 138. Space for a number of batteries such as batteries 156, 158 typically of the nickel cadmium variety is also provided in member 130.

Other embodiments will occur to those skilled in the art and are within the following claims.

What is claimed is:

1. A display device comprising:
first planar reflection means;
second partially reflecting, planar reflection means disposed at a first angle to said first reflection means; and
means for magnifying an item to be displayed and for directing radiation from the item to one of said reflection means at a second angle to produce multiple reflections of the radiation between said first and second reflection means, at least one reflection from said second partially reflecting reflection means and two reflections from said first reflection means, and transmission of said radiation through said second partially reflecting reflection means to provide a display of said item proximate said second partially reflecting reflection means.

2. The device of claim 1 in which said second angle is equal to $n$ times said first angle where $n$ is the number of reflections undergone by said radiation.

3. The device of claim 1 including means for selectively separating radiation transmitted from said second reflection means following a predetermined number of reflections from radiation transmitted following other numbers of reflections.

4. The device of claim 3 in which said means for separating includes means for focusing.

5. The device of claim 4 in which said means for focusing includes a Fresnel lens.

6. The device of claim 5 in which said Fresnel lens has a surface prepared to diffuse the radiation propagated by said Fresnel lens and broaden the focal area.

7. The device of claim 1 further including means for diffusing radiation transmitted by said second reflecting means to increase the area of the display visible at a viewing position.

8. A display device comprising;
first planar reflection means;
second partially reflecting, planar reflection means disposed at a first angle to said first reflection means;
means for magnifying an item to be displayed and for directing radiation from the item to one of said reflection means at a second angle to produce multiple reflections of the radiation between said first and second reflection means, at least one reflection from said second partially reflecting reflection means and two reflections from said first reflection means, and transmission of said radiation through said second partially reflecting reflection means to provide a display of said item proximate said second partially reflecting reflection means; and
means for selectively separating radiation transmitted by said second reflection means.

9. A display device comprising:
first planar reflection means;
second partially reflecting, planar reflection means disposed at a first angle to said first reflection means;
means for magnifying an item to be displayed and for directing radiation from the item to one of said reflection means at a second angle to produce multiple reflections of the radiation between said first and second reflection means, at least one reflection from said second partially reflecting reflection means and two reflections from said first reflection means, and transmission of said radiation through said second partially reflecting reflection means to provide a display of said item proximate said second partially reflecting reflection means;
means for focusing radiation transmitted by said second reflection means; and
means for diffusing radiation propagated by said means for focusing to produce a broader focus.

10. A display device comprising:
first planar reflection means:
second partially reflecting, planar reflection means disposed at a first angle to said first reflection means; and
means for magnifying an item to be displayed and for directing radiation from the item to one of said reflection means at a second angle to produce multiple reflections of the radiation between said first and second reflection means, at least one reflection from said second partially reflecting reflection means and two reflections from said first reflection means, and transmission of said radiation through said second partially reflecting reflection means to provide a display of said item proximate said second partially reflecting reflection means; and
means for diffusing radiation transmitted by said second reflecting means to increase the area of the display visible at a viewing position.

11. A compact optical display device comprising:
means for positioning an item to be displayed;
means for illuminating said item;
a first planar mirror;
a second partially reflecting planar mirror disposed at a first angle to said first reflection means; and
means for magnifying the item to be displayed and for directing radiation from the item to one of said mirrors at a second angle to produce multiple reflection of the radiation between said first and second mirrors, at least one reflection from said second partially reflecting reflection means and two reflections from said first reflection means, and the transmission of said radiation through said second partially reflecting mirror to provide a display of the item.

* * * * *